United States Patent [19]

Shimizu et al.

[11] Patent Number: 5,445,332
[45] Date of Patent: Aug. 29, 1995

[54] FOOD PROCESSOR

[75] Inventors: Tetsuhiko Shimizu; Tomomi Koiwai, both of Matsumoto, Japan

[73] Assignee: Kabushiki Kaisha Izumi Seiki Seisakusho, Matsumoto, Japan

[21] Appl. No.: 298,451

[22] Filed: Aug. 29, 1994

[30] Foreign Application Priority Data

Sep. 2, 1993 [JP] Japan ................... 5-218264
Dec. 28, 1993 [JP] Japan ................... 5-335910

[51] Int. Cl.⁶ ............... A47J 43/06; A47J 44/00; B26D 3/26; B02C 19/12
[52] U.S. Cl. .................... 241/100; 83/167; 83/356.2; 83/437; 83/932; 99/537; 99/588; 241/94; 241/273.1; 241/292.1
[58] Field of Search ............... 99/537, 538, 571, 582, 99/589, 588, 591; 83/167, 856-858, 425.3, 431, 437, 932, 147, 355, 356.2; 241/94, 95, 100, 92, 273.1, 292.1, 199.7, 262, 273.2; 30/280; D7/412, 673, 695

[56] References Cited

U.S. PATENT DOCUMENTS

| | | | |
|---|---|---|---|
| 4,072,277 | 2/1978 | Seydelmann | 241/292.1 |
| 4,186,543 | 2/1980 | Lyell | 99/582 |
| 4,212,431 | 7/1980 | Doyell | 241/100 |
| 4,283,979 | 8/1981 | Rakocy et al. | 241/92 |
| 4,369,680 | 1/1983 | Williams | 83/356.2 |
| 4,389,860 | 6/1983 | Necas et al. | 241/282.1 |
| 4,516,733 | 5/1985 | Funagura et al. | 241/92 |
| 4,546,928 | 10/1985 | Suzuki | 241/100 |
| 4,856,718 | 8/1989 | Gaber et al. | 241/273.1 |
| 5,075,973 | 12/1991 | Borner | 83/932 |
| 5,148,731 | 9/1992 | Boerner | 99/537 X |

FOREIGN PATENT DOCUMENTS

| | | |
|---|---|---|
| 5-76456 | 3/1993 | Japan . |
| 5-84144 | 4/1993 | Japan . |
| 5-84145 | 4/1993 | Japan . |
| 5-84146 | 4/1993 | Japan . |

Primary Examiner—Timothy F. Simone
Attorney, Agent, or Firm—Jordan and Hamburg

[57] ABSTRACT

The object of the invention is to provide a food processor, which can be compact in size and can be easily washed. In the food processor, a tray accommodates processed food, and an upper face thereof is opened. A cutter plate is provided to an upper section of the tray and capable of reciprocatively moving along the upper face thereof so as to process food materials. A guide member supports the cutter plate and guides the movement of the cutter plate, and it is provided on an inner face of the tray. A cover is provided above the cutter plate and attached to the tray, and it has a cylindrical member into which the food materials are put. A drive section has a motor for moving the cutter plate and a connecting member for connecting the motor and the cutter plate, and it is capable of attaching to the upper section of the tray, wherein the connecting member connects the motor and the cutter plate when the drive section is attached to the tray.

20 Claims, 11 Drawing Sheets

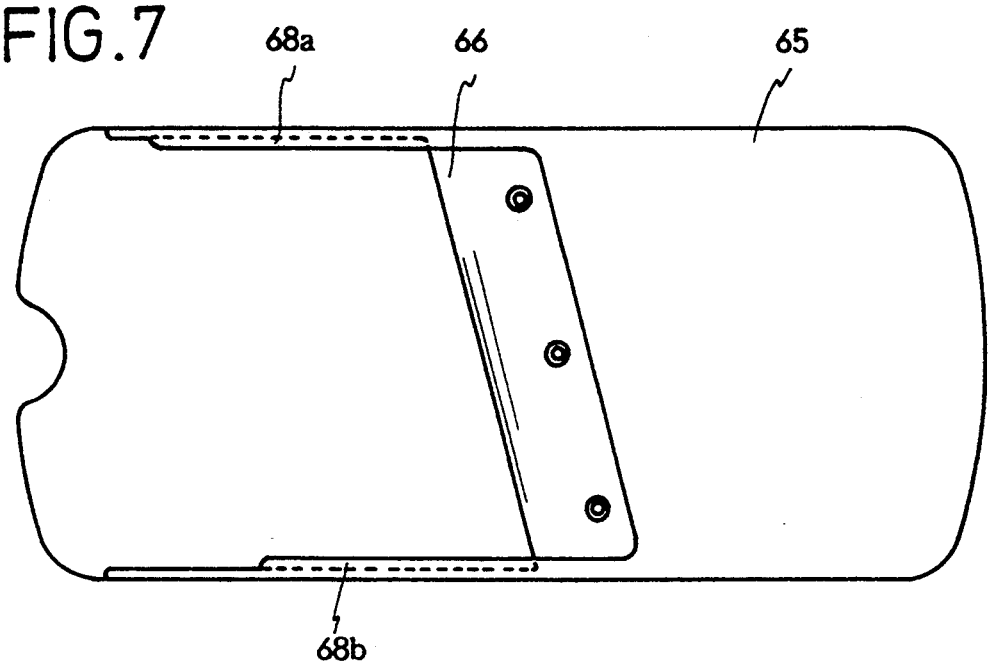
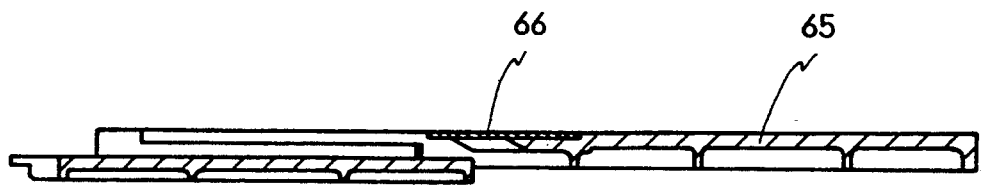
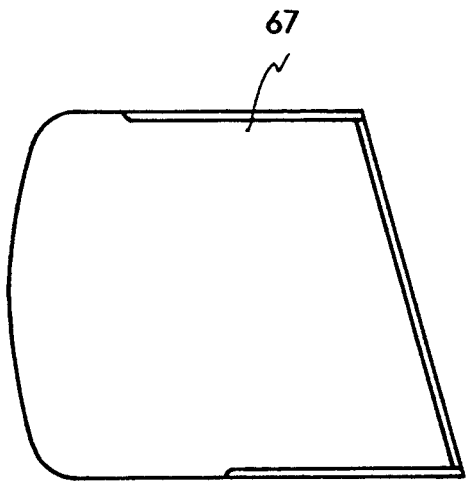
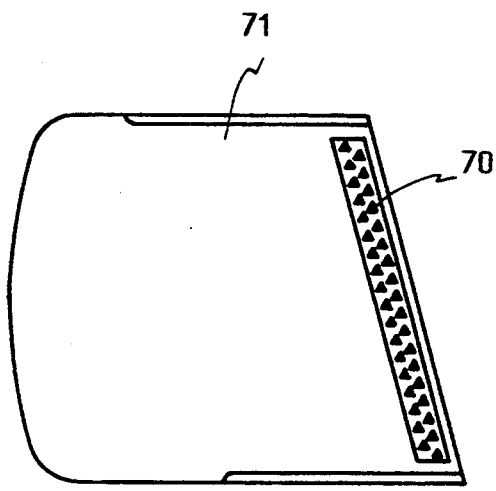

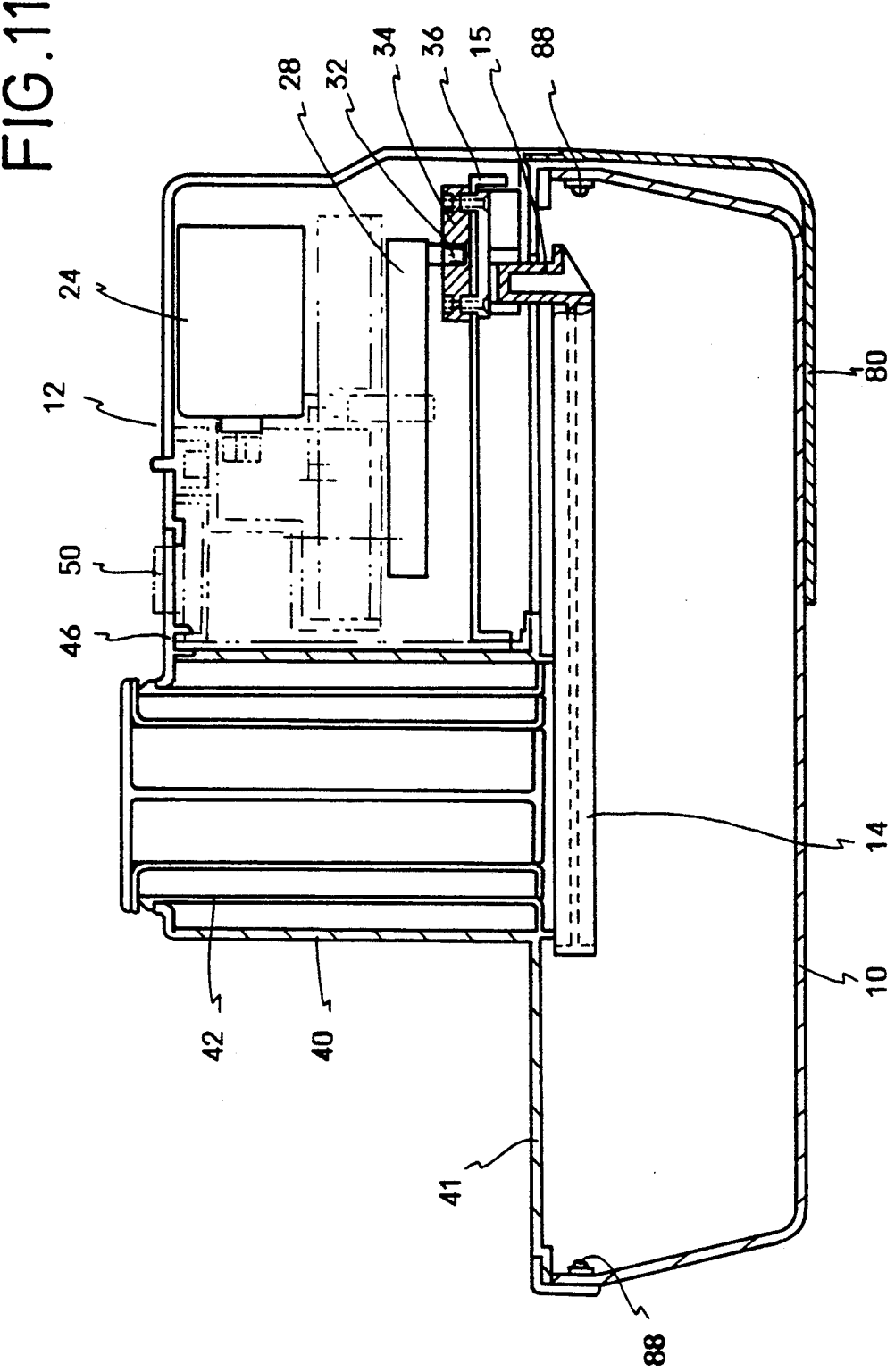

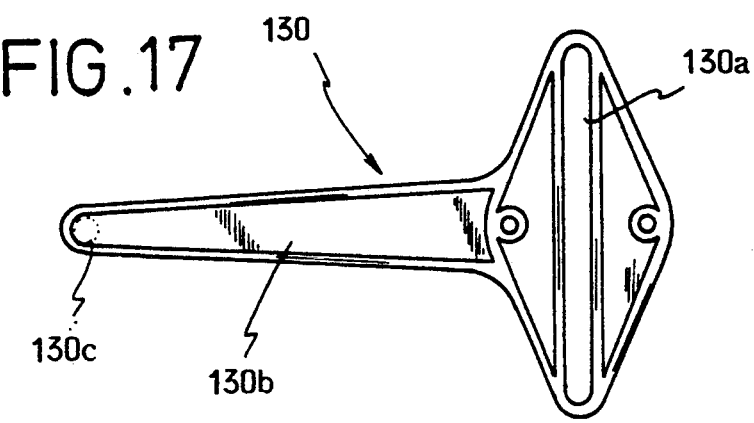
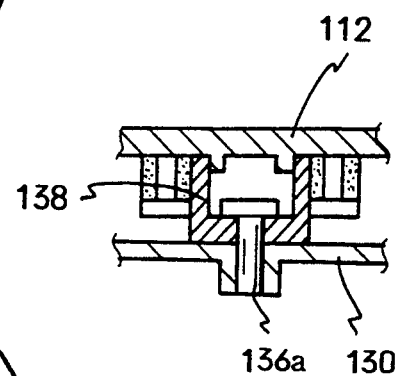
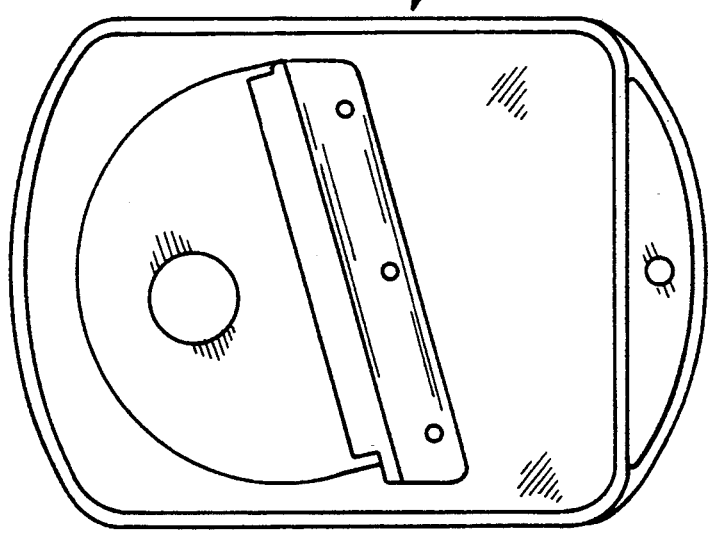
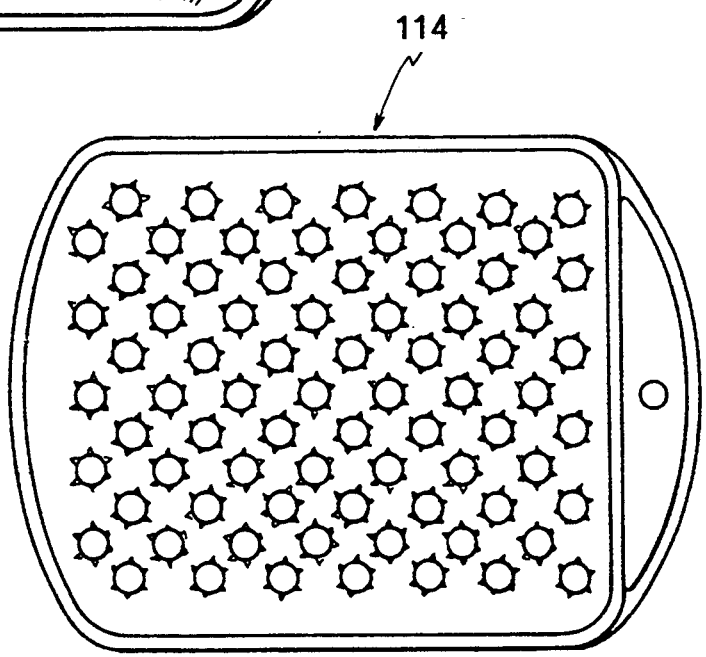

FOOD PROCESSOR

BACKGROUND OF THE INVENTION

The present invention relates to a food processor, more precisely relates to a food processor, which is capable of slicing, shredding and grating food materials, etc..

Food processors have been used for slicing, shredding, grating food materials, e.g., vegetables, etc.. Conventional food processors have rotary blades for slicing food materials, etc.. By using the conventional food processors with the rotary blades, however, shredded food is apt to be curved. And fibers of grated food is sometimes lodged on the rotary blades, so that grating cannot be executed well.

To solve the above described disadvantages, an improved food processor having a cutter plate, which is capable of reciprocatively moving, has been invented (see Japanese Patent Kokai Gazette No. 5-84144). In this food processor, food materials are put into a cylindrical member and sliced or shredded by the cutter plate reciprocatively moving. Processed food, which has been sliced or shredded, is accommodated in a tray, which is located below the cutter plate. By reciprocatively moving the cutter plate, the processed food can be prevented from being curved. And fibers of grated food cannot be lodged, so that grating can be executed well.

However, the improved food processor with the cutter plate must be large in size. And a plurality of parts are integrally assembled, so it is difficult to wash each parts.

SUMMARY OF THE INVENTION

An object of the invention is to provide a food processor, which can be compact in size and can be easily washed.

To achieve the object, the food processor of the present invention has following basic structures.

The food processor having a first basic structure comprises:
- a tray being capable of accommodating processed food, an upper face of the tray being opened;
- a cutter plate being provided to an upper section of the tray, the cutter plate being capable of reciprocatively moving along the upper face of the tray so as to process food materials;
- guiding means for supporting the cutter plate and guiding the reciprocative movement of the cutter plate, the guiding means being provided on an inner face of the tray;
- a cover being provided above the cutter plate and attached to the tray, the cover having a cylindrical member into which the food materials are put; and
- a drive section having driving means for reciprocatively moving the cutter plate and connecting means for mutually connecting the driving means and the cutter plate, the drive section being capable of attaching to the upper section of the tray, wherein the connecting means mutually connects the driving means and said cutter plate when the drive section is attached to the tray.

The food processor having a second basic structure comprises:
- a tray being capable of accommodating processed food, an upper face of the tray being opened;
- a cutter plate being provided to an upper section of the tray, the cutter plate being capable of reciprocatively moving along the upper face of the tray so as to process food materials;
- guiding means for supporting the cutter plate and guiding the reciprocative movement of the cutter plate, the guiding means being provided on an inner face of the tray;
- a cover being provided above the cutter plate and attached to the tray, the cover having a cylindrical member into which the food materials are put; and
- a stand for supporting the tray;
- a drive section having driving means for reciprocatively moving the cutter plate and connecting means for mutually connecting the driving means and the cutter plate, the drive section being capable of attaching to the upper section of the tray, wherein the connecting means mutually connects the driving means and said cutter plate when the drive section is attached to the stand.

The food processor having a third basic structure comprises:
- a tray being capable of accommodating processed food, an upper face of the tray being opened;
- a cutter plate being provided above the tray, the cutter plate being capable of reciprocatively moving along the upper face of the tray so as to process food materials;
- a setting section being capable of accommodating the tray, an upper face of the tray being opened;
- a cover being provided above the cutter plate and attached to the setting section, the cover having a cylindrical member into which the food materials are put;
- guiding means for supporting the cutter plate and guiding the reciprocative movement of the cutter plate, the guiding means being provided on an inner face of the setting section; and
- a drive section having driving means for reciprocatively moving the cutter plate and connecting means for mutually connecting the driving means and the cutter plate, the drive section being capable of attaching to the upper section of the tray, wherein the connecting means mutually connects the driving means and said cutter plate when the drive section is attached to the setting section.

In the food processor of the present invention, the driving section, etc. are provided over the tray so the size of the food processor can be small. And the cutter plate is capable of reciprocatively moving along the upper face of the tray. So in spite of small size, the stroke of the cutter plate can be long, so that big food materials, e.g., a whole radish, can be processed without prior cut. Further, the tray, the driving section, the cover, etc. can be disassembled, so they can be respectively and easily washed.

BRIEF DESCRIPTION OF THE DRAWINGS

Embodiments of the present invention will now be described by way of examples and with reference to the accompanying drawings, in which:

FIG. 7 is a plan view of an extra cutter section;

FIG. 8 is a sectional view thereof;

FIG. 9 is a plan view of an adjusting plate;

FIG. 10 is a plan view of an adjusting plate for shredding;

FIG. 11 is a side sectional view of a food processor of a second embodiment;

FIG. 17 is a bottom view of a movable plate;

FIG. 18 is a partial sectional view thereof;

FIG. 19 is a plan view of the cutter plate; and

FIG. 20 is a plan view of another cutter plate.

DETAILED DESCRIPTION OF THE PREFERRED EMBODIMENTS

Preferred embodiments of the present invention will now be described in detail with reference to the accompanying drawings.

(First Embodiment)

Figure 1:
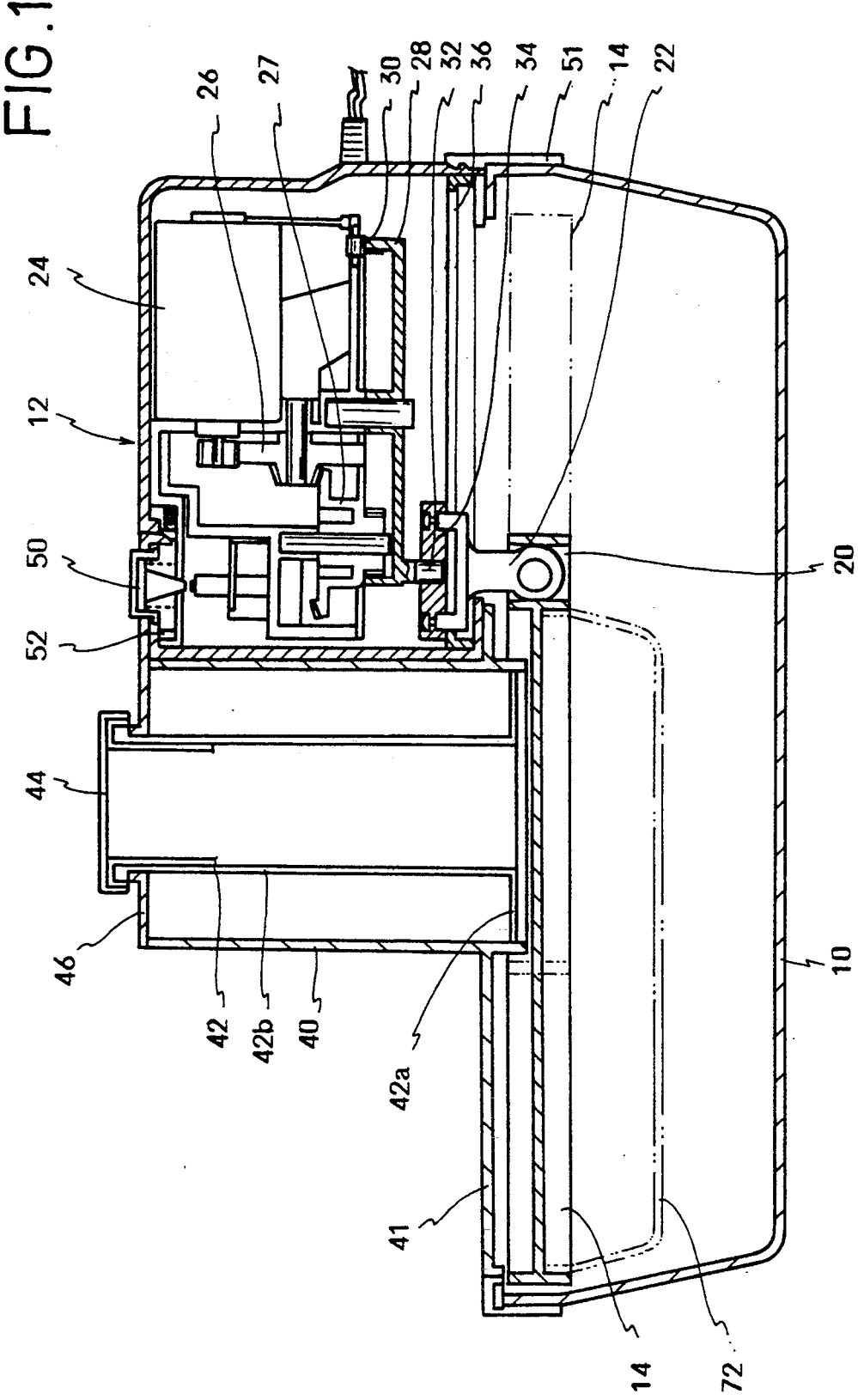
FIG. 1 is a side sectional view of a food processor of a first embodiment.
Figure 2:
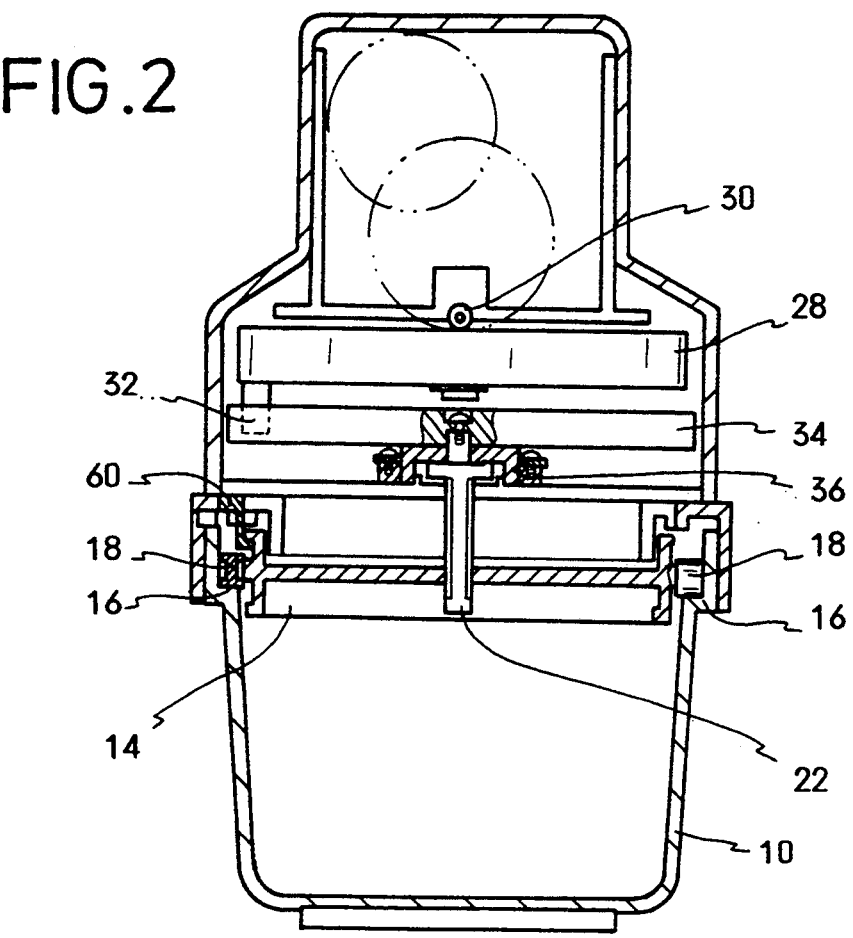
FIG. 2 is a front sectional view thereof.

In a food processor shown in FIGS. 1 and 2, a cover 41 having a cylindrical member 40 is attached to an opening section of a tray 10 into which processed food is accommodated. A drive section 12, which includes driving means, is attached to a rear section of the cylindrical member 40.

A whole upper face of the tray 10, which is formed into a box shape, is opened. A cutter plate 14 is supported and capable of reciprocatively moving along the opened upper face of the tray 10. The cutter plate 14 is connected to the driving means of the drive section 12, so that the cutter plate 14 can be moved reciprocatively. As shown in FIG. 2, there are formed step sections 16 in an inner upper section of the tray 10, and they are formed in the longitudinal direction of the tray 10. There are rotatably provided rollers 18 on outer side faces of the cutter plate 14. The rollers 18 are rotatably supported the step sections 16, so that the cutter plate 14 can be reciprocatively moved along the step sections 16.

Figure 5:
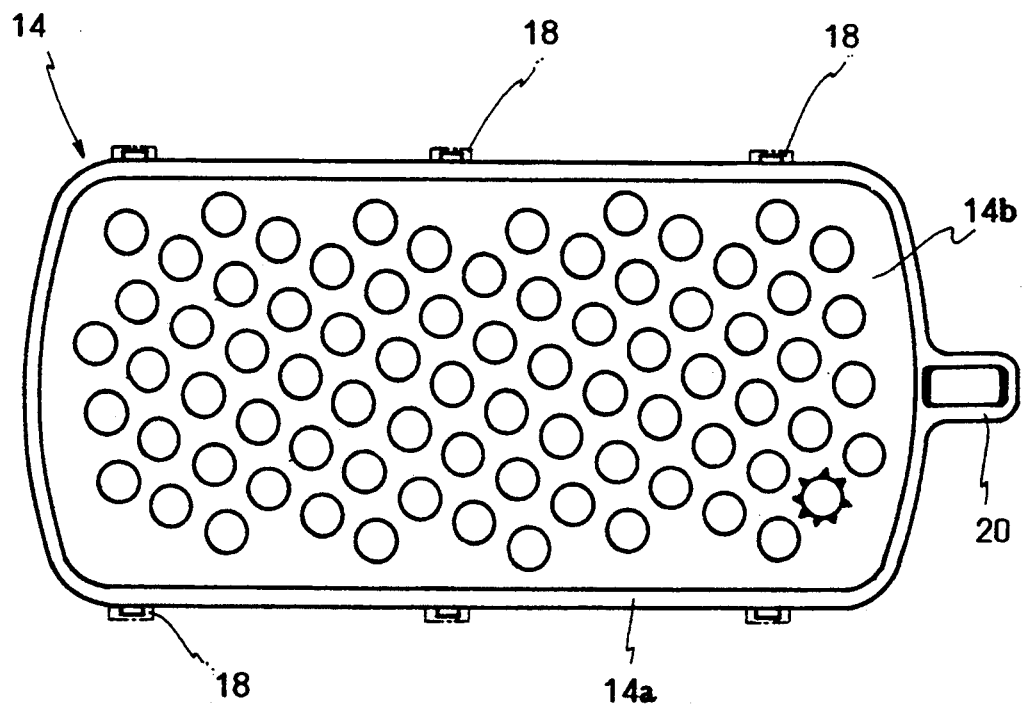
FIG. 5 is a plan view of a cutter plate having a cutter section for grating.
Figure 6:
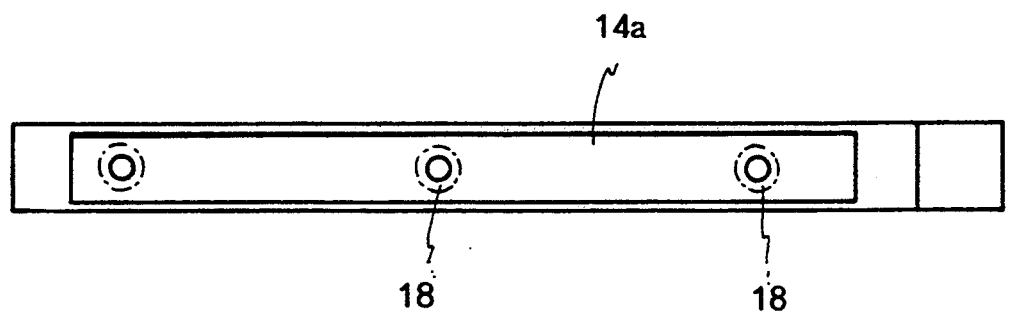
FIG. 6 is a side view of the cutter plate.

The cutter plate 14 having a cutter section 14b for grating is shown in FIGS. 5 and 6. The cutter plate 14 comprises a frame section 14a and the cutter section 14b. The cutter section 14b can be exchanged according to kinds of processing food materials. There is formed an engage section 20 at one end of the frame section 14. The engage section 20 is capable of engaging with a drive lever 22 of the drive section 12.

An electric motor 24 is accommodated in the drive section 12 as the driving means. Rotary motion of the motor 24 is converted to reciprocative linear motion of the drive lever 22. A first gear 26 is engaged with a gear which is fixed to an output shaft of the motor 24; a second gear 27 is engaged with the first gear 26; and a driving gear 28 is engaged with the second gear 27. The gear ratio among the gears 26, 27 and 28 are designed to rotate the driving gear 28 at desired speed. The driving gear 28 is rotated in a plane, which is parallel to a plane in which the cutter plate 14 moves.

The driving gear 28 defines the stroke of the drive lever 22. The cutter plate 14 is reciprocatively moved by the drive lever 22. With this structure, diameter of the driving gear 28 is made greater so as to make the stroke of the cutter plate 14 longer. To smoothly rotate the driving gear 28, a support roller 30, which contacts and rotate on an upper end face of the driving gear 28, is provided. Note that, the second gear 27 is engaged with gear teeth formed on an inner circumferential face of the driving gear 28 so as to rotate the driving gear 28.

Next, a mechanism for converting the rotary motion of the driving gear 28 to the reciprocative linear motion of the drive lever 22 will be explained. A drive roller 32 is eccentrically provided to the driving gear 28. The drive roller 32 is engaged with a movable plate 34. The movable plate 34 is linearly moved along guide rail 36.

The relationship among the movable plate 34, the guide rail 36, etc. will be explained. The drive lever 22 is fixed to the movable plate 34. The fixed part is formed into a U-shape. Front ends of the U-shaped part are slidably inserted into a guide hole 36a of the guide rail 36.

Figure 3:
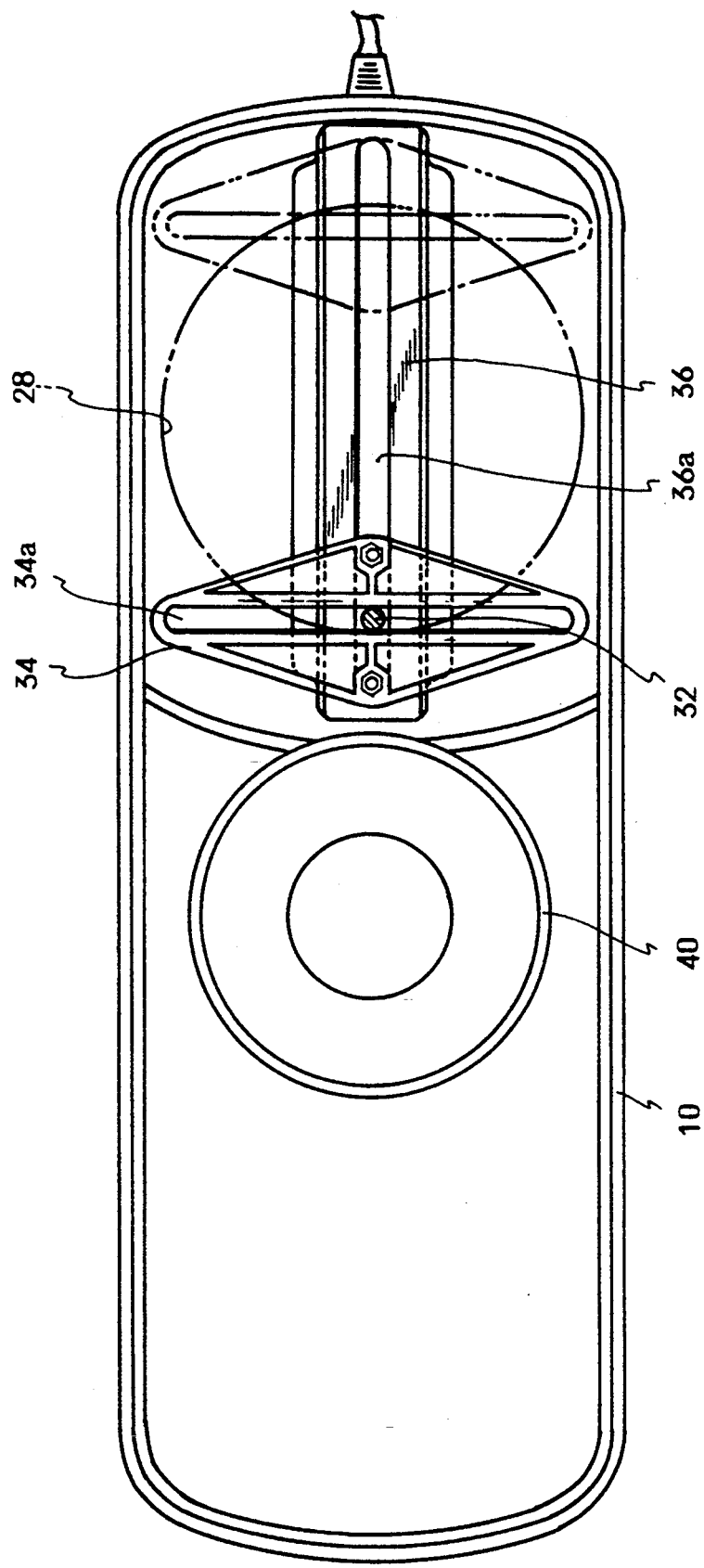
FIG. 3 is a plan view thereof.

In FIG. 3, the guide hole 36a of the guide rail 36 is formed parallel to the longitudinal direction of the tray 10. The guide rail 36 is fixed to the drive section 12.

The movable plate 34 is formed into a diamond shape in a plan. The movable plate 34 has an engage hole 34a in which the drive roller 32 is inserted. The engage hole 34a is formed perpendicular to the guide hole 36a of the guide rail 36. The drive roller 32 is moved by the rotation of the driving gear 28 with a circular track. Thus, the engage hole 34a is formed into a long hole, which defines the stroke of the movement of the drive roller 32. Length of the guide hole 36a is defined on the basis of the stroke of the drive roller 32 and the position of the U-shaped part of the movable plate 34.

When the driving gear 28 is rotated, the drive roller 32 moves in the engage hole 34a, so that the movable plate 34 is reciprocatively moved. Since the drive lever 22 is fixed to the movable plate 34, the drive lever 22 can be reciprocatively moved together with the movable plate 34. The stroke of the drive lever 22 is defined on the basis of diameter of the circular track of the drive roller 32.

In FIG. 1, food materials, e.g., vegetables, are put onto the cutter plate 14 via the cylindrical member 40. The cylindrical member 40 is integrated with the cover 41, which is attached on the opened upper face of the tray 10. The size and the shape of the cylindrical member 40 can be designed optionally. In the first embodiment, the cylindrical member 40 is formed into a circular cylinder, and big materials, e.g., a whole radish, can be put thereinto.

A pusher 42 is inserted into the cylindrical member 40. The pusher 42 is used for pressing food materials onto the cutter plate 14. There is formed a circular flange 42a, whose diameter is corresponded to inner diameter of the cylindrical member 40, at a lower end of the pusher 42.

Note that, a pushing section 42a of the pusher 42 is formed into a cylinder so as to easily process small food materials. And a small pushing rod 44 is slidably inserted in the pushing section 42a. A bottom face of the pushing rod 44 coincides with that of the flange 42a when the pushing rod 44 is fully inserted in the pushing section 42a.

A lid 46 is capable of covering over an opening upper face of the cylindrical member 40. The lid 46 prevents the food materials in the cylindrical member 40 from scattering outside. The lid 46 has function of a safety mechanism. Namely, If the lid 46 is not set, the food processor cannot operate so as to secure safety.

Figure 4:
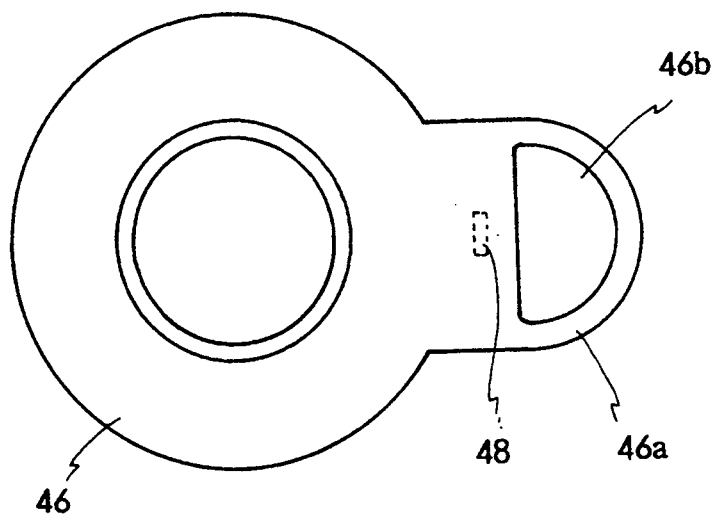
FIG. 4 is a plan view of a lid, which is attached to a cylindrical member.

In FIG. 4, the lid 46 has a disc section, which corresponds to the shape of the cylindrical member 40, and a projected section 46a, which is extended from an outer edge of the disc section. There is bored a hole 46b, into which a switch button 50 of the drive section 12 is inserted, in the projected section 46a. The switch button 50 is provided on an upper face of the drive section 12 as shown in FIG. 1. When the lid 46 covers the cylindrical member 40, the switch button 50 just comes into the hole 46b. In the first embodiment, since a top section of the switch button 50 is formed into a hemisphere, the inner shape of the hole 46b is formed into a hemisphere corresponding to the switch button 50.

There is provided a lock button 52 in the drive section 12, which is located beside the switch button 50. There is projected a releasing boss 48 downward from a bottom face of the lid 46. Thus, the releasing boss 48 pushes the lock button 52 when the lid 46 covers the cylindrical member 40, so that the switch button 52 is released. With this structure, the food processor can operate while the lid 46 covers the cylindrical member 40.

Note that, as the safety mechanism, the switch button may be provided in the drive section 12 and a projected section for pushing the switch button may be provided to the lid 46. In this case, too, the food processor can operate while the lid 46 covers the cylindrical member 40.

To operate the above described food processor, firstly, the drive section 12 and the cover 41 are assembled without the tray 10. Then the cutter plate 14 is attached to the drive section 12. One end of the drive lever 22 is projected from a long hole of the cover 41, whose length is as long as the the stroke of the linear movement of the drive lever 22. Thus, the drive lever 22 is inserted into a hole of the engage section 20 of the cutter plate 14 to set.

Note that, if the cutter plate 14 is set downward by engaging with the drive lever 22, the cutter plate 14 falls down, so the cutter plate 14 is temporarily fixed to the cover 41 when the cutter plate 14 is engaged with the drive lever 22. The cutter plate 14 is temporarily fixed to the cover 41 by engaging a hook 60, which is formed on a bottom face of the cover 41, with a side face of the frame section 14a of the cutter plate 14.

In the state of temporarily fixing the cutter plate 14, the tray 10 is attached to the drive section 12 and the cover 41. By attaching the tray 10, the roller 18 is mounted on the step section 16 of the tray 10, so that the frame section 14a is located above the hook 60. With this structure, the cutter plate 14 can be reciprocatively moved on the step section 16.

In FIG. 1, the cutter plate 14 locates at a front stroke end. Even if the cutter plate 14 locates at a front stroke end or a rear stroke end, a part of the cutter plate 14 is always located under the cylindrical member 40.

After the tray 10 is set, food materials are put into the cylindrical member 40 then the lid 46 is set and the switch button 50 is pushed. Upon pushing the switch button 50, the food processor starts. Namely, the cutter plate 14 is reciprocatively moved by the drive lever 22. When the food materials are pressed by the pushing rod 42, the food materials are processed, e.g., slicing. Food materials processed fall into the tray 10 and be accommodated therein. After the processing the food materials, the tray 10 is detached from the drive section 12 and the cover 41 so as to take out the processed food. Note that, the tray 10 is detached from the drive section 12 and the cover 41 by moving a releasing lever 51.

In the first embodiment, the cutter plate 14 is capable of reciprocatively moving over a whole opened upper face of the tray 10, so that big food materials, e.g., a whole radish, can be processed without prior cut. And the tray 10, the driving section 12 and the cover 41 can be disassembled, so they can be respectively and easily washed. The driving section 12 and the cover 41 are provided over the tray 10 so the size of the food processor can be small. Further, the tray 0 works as a member for supporting the drive section 12, etc., so number of parts can be reduced.

In FIG. 5, the cutter plate 14 has a cutter section 14b for grating. Since the cutter plate 14 is reciprocatively and linearly moved to process food materials, the grating by the food processor of the present invention will be better than that of the conventional food processor having rotary blades. Note that, degree of the grating can be adjusted by selecting roughness of upper and lower faces of the cutter section 14b.

An extra cutter section 65 for slicing is shown in FIGS. 7 and 8. As described above, the cutter section 65 can be attached to the common frame section 14a of the cutter plate 14. The cutter section 65 has a slicing blade 66 in a center part. Thickness of slicing is defined on the basis of a gap between the slicing blade 66 and a plate face (see FIG. 8). The thickness of slicing can be adjusted by exchanging an adjusting plate 67 (see FIG. 9), which is fitted in engage grooves 68a and 68b, which are formed in an inner face of the cutter section 65.

An extra cutter section 65 for shredding is shown in FIG. 10. An adjusting plate 71, which has shredding blades 70, is attached to the cutter section 65. The adjusting plate 71 is fitted in the engage grooves 68a and 68b of the cutter section 65 as well as the adjusting plate 67. The food materials are shredded by the shredding blades 70 and the slicing blade 66.

In case of processing small amount of food materials, the tray 10 is too large to handle. To solve this problem, there is attached a small inner tray 72 to the bottom face of the cutter plate 14 (see FIG. 1). The inner tray 72 can be reciprocatively moved together with the cutter plate 14 while processing the food materials. In this case, the processed food is accommodated in the inner tray 72. The inner tray 72 can be attached to and detached from the frame section 14a of the cutter plate 14.

(Second Embodiment)

Figure 12:
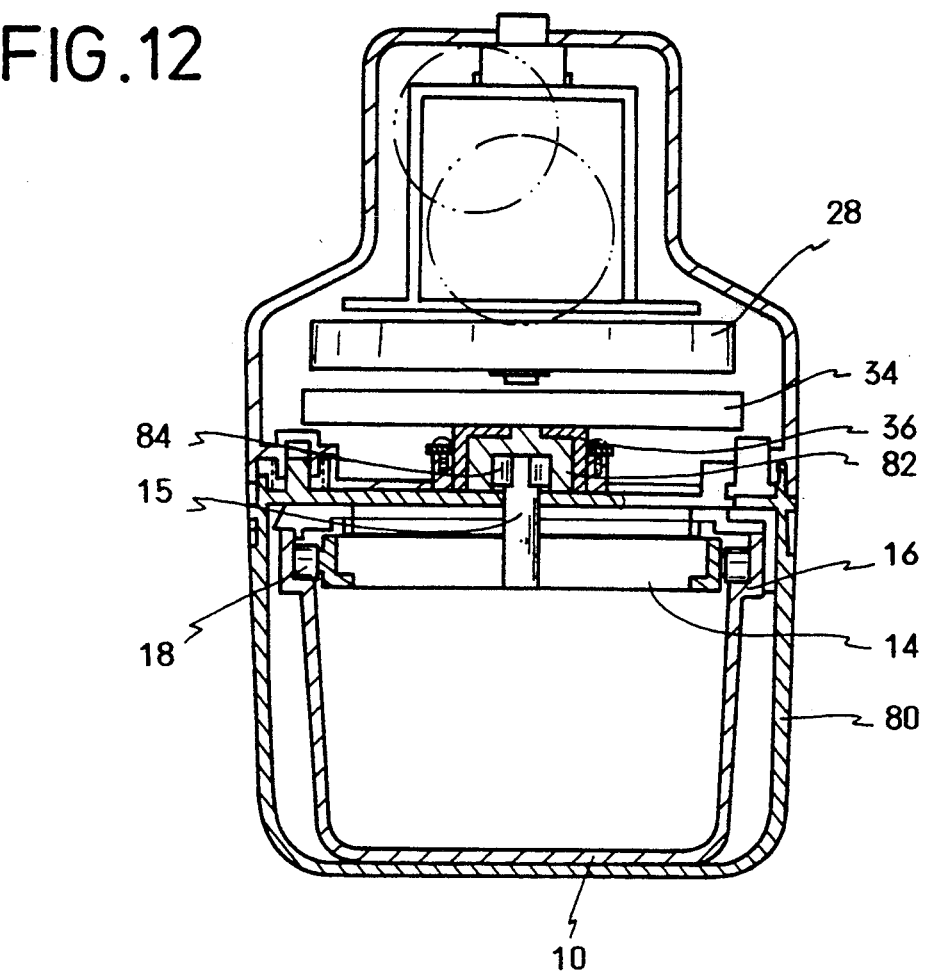
FIG. 12 is a front sectional view thereof.

The food processor of a second embodiment is shown in FIGS. 11 and 12.

In the first embodiment, the cutter plate 14 and the drive section 12 should be engaged with the drive lever 22 to set the tray 10. So the cover 41 and the drive section 12 are manually handled but it is troublesome to treat them manually. To solve the problem, in the second embodiment, the drive section 12 can be set without manual handling.

In FIG. 11, the drive section 12 including the motor 24 is mounted on a stand 80. The tray 10 is inserted into a lower space of the drive section 12 from a front side of the stand 80 and attached to the lower side of the drive section 12. The stand 80 is formed into a box whose front face are opened to insert the tray 10 in the space.

The drive section 12 is capable of vertically moving with respect to the stand 80 so as to set the tray 10.

The arrangement of the motor 24 and the gears in the drive section 12 is as well as that of the first embodiment. There is provided the drive roller 32 in the driving gear 28. The drive roller 32 is fitted with the movable plate 34. The movable plate 34 is supported and guided to reciprocatively move by the guide rail 36. Note that, the drive section 12 can be automatically connected to the cutter plate 14 by mounting the cutter plate 14 onto the tray 10.

As shown in FIG. 12, the cutter plate 14 of the second embodiment has the engage section 15, which is projected upward, at one end. The engage section 15 is capable of engaging with a locking mechanism 82, which is provided below the movable plate 34 of the drive section 12. A slide section of the locking mechanism 82 is fixed on a bottom face of the movable plate 34. There is provided lock levers 84 in the slide section. The slide section is guided by a guide hole of the guide rail 36.

Figure 13:
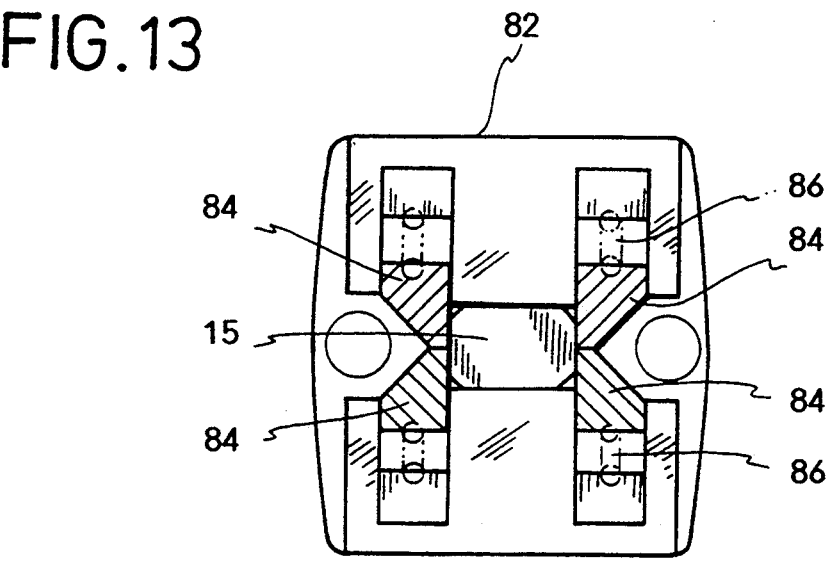
FIG. 13 is a plan view of lock levers of a locking mechanism.

In FIG. 13, the lock levers 84 are capable of moving in the direction perpendicular to the direction of the reciprocative movement of the cutter plate 14 or the engage section 15. Each pair of the lock levers 84 are always biased to mutually contact by springs 86. Upon engaging with the engage section 15, the lock levers 84 are capable of holding the engage section 15 so as not to move back and forth. Outer side faces of the lock levers 84 are formed into slope faces so as to easily introduce the engage section 15 into the locking mechanism 82. Note that, outer side faces of the engage section 15 are also formed into slope faces so as to easily come thereinto.

To operate the food processor of the second embodiment, firstly the cutter plate 14 is mounted onto the tray 10, the cover 41 is set on the tray 10, and the tray 10 on which the cutter plate 14 and the cover 41 have been set is inserted into the stand 80. The cutter plate 14 can be automatically engaged with the drive section 12, so the cutter plate 14 is allowed to locate at any positions when the cutter plate 14 is mounted on the tray 10.

When the tray 10 is inserted into the stand 80, the drive section 12 has been slightly slid upward. After the tray 10 is inserted, the drive section 12 is pushed downward to fix to the stand 80. By the fixation, the engage section 15 can be apt to engage with the locking mechanism 82.

In a state of mounting the cutter plate 14 on the tray 10 and setting the tray 10 in the stand 80, the engage section 15 is not engaged with the locking mechanism 82, but the cutter plate 14 is moved by the locking mechanism 82 when the movable plate 34 moves. When the cutter plate 14 gets to the stroke end, the locking mechanism 82 is further moved, so that the engage section 15 opens the lock levers 84 and is caught in the locking mechanism 82. Since the engage section 15 of the cutter plate 14 locates on the track of the movement of the locking mechanism 82, above described motions, e.g., opening the lock levers 84, are automatically executed. There are provided dampers 88, which absorb shock caused by the tray 10, on front and rear inner faces of the tray 10.

The food materials are put into the cylindrical member 40 as well as the first embodiment. Note that, in the second embodiment, there are two coaxial sub-pushing rods in the pushing rod 42, so inner diameter of the cylindrical member 40 can be selected on the basis of size of the food materials. After completing food processing, the drive section 12 is slightly moved upward and the tray 10 in which processed food is accommodated can be drawn from the stand 80.

In the second embodiment, the tray 10 can be inserted into and drawn from the stand 80 without handling the drive section 12. And, since the cutter plate 14 can be automatically connected to the drive section 12, the cutter plate 14 can be attached very easily.

Note that, the connecting mechanism which connects the cutter plate 14 and the drive section 12 can be employed to the food processor of the first embodiment. Namely, the engage section 15 is provided to the cutter plate 14 of the first embodiment, and the engage section 15 is capable of engaging with the locking mechanism 82. With this structure, the cutter plate 14 and the locking mechanism 82 are automatically connected by: mounting the cutter plate 14 onto the tray 10 setting the cover 41 on the tray 10; and setting the drive section 12 onto the cover 14. By the automatic connecting mechanism, the action of assembling the cutter plate 14 and the drive lever 22 can be omitted. Namely, the food processor of the first embodiment can be started by only setting the cover 41 and the drive section 12 onto the tray 10, which works as a supporting means.

(Third Embodiment)

Figure 14:
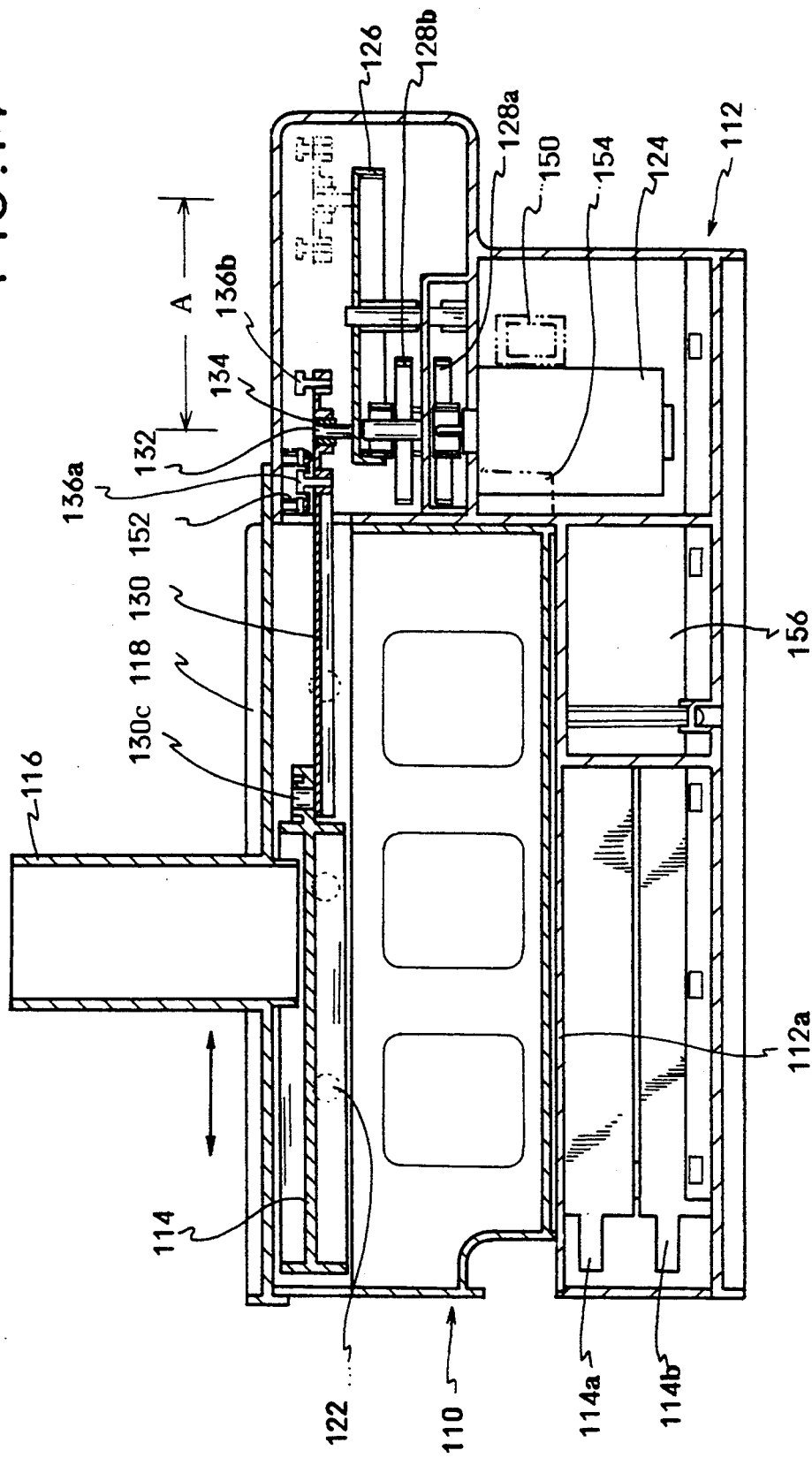
FIG. 14 is a side sectional view of a food processor of a third embodiment.
Figure 15:
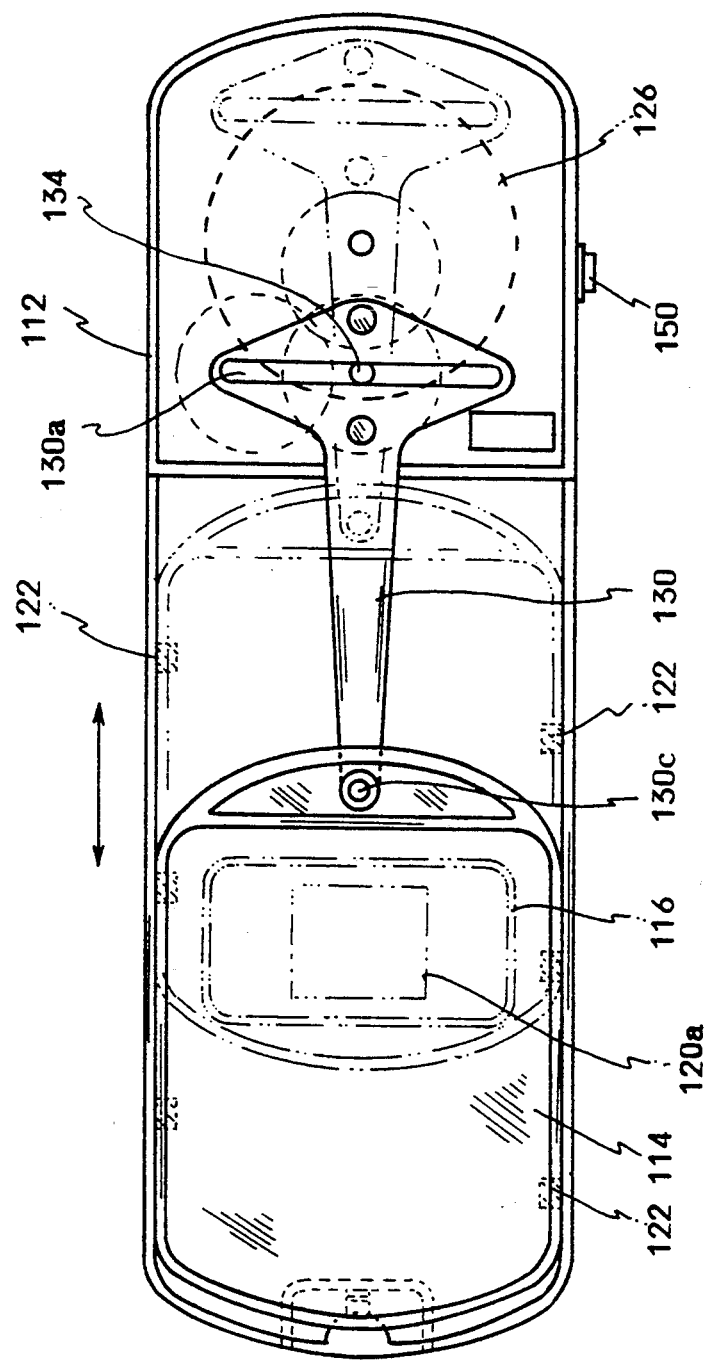
FIG. 15 is a plan view thereof.
Figure 16:
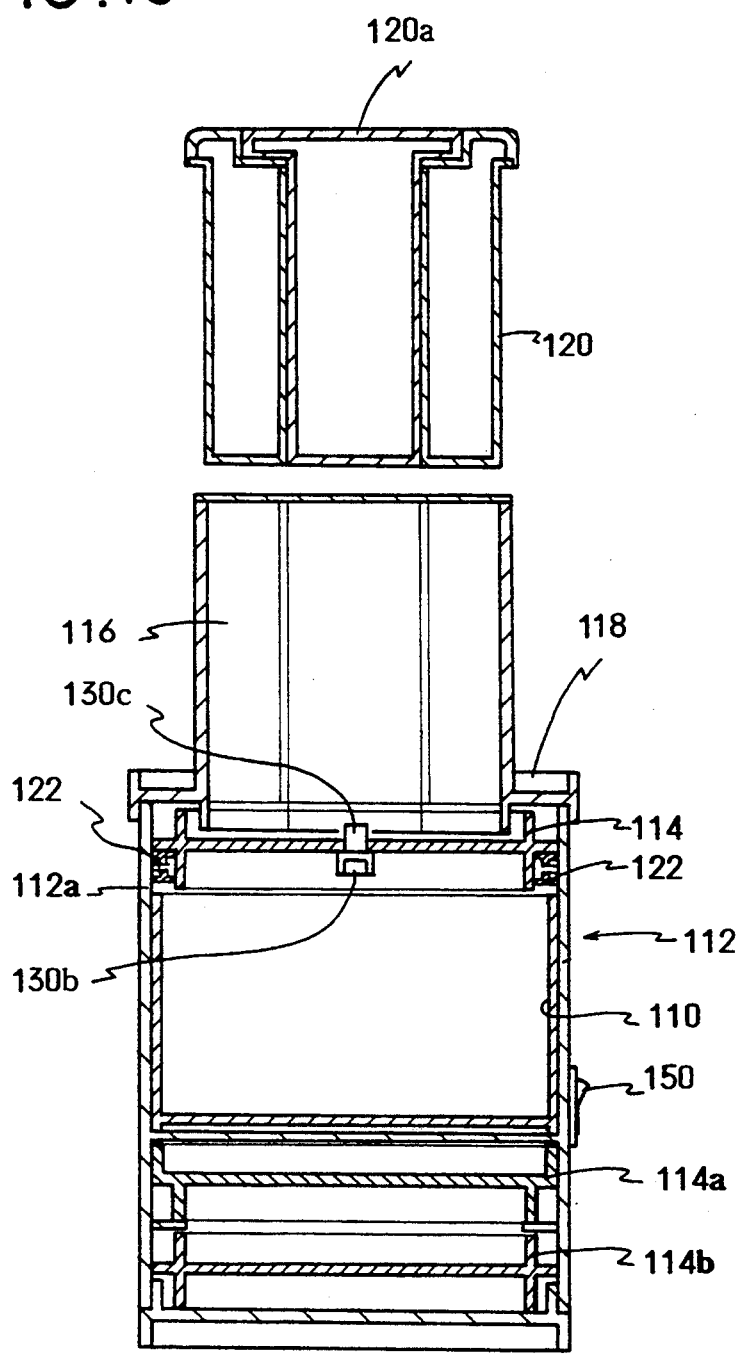
FIG. 16 is a front sectional view thereof.

In FIGS. 14–16, a tray 110 is inserted into a front section of a drive section 112, which is capable of reciprocatively moving a cutter plate 114, to set. The drive section 112 has a setting section 112a into which the tray 110 is inserted. The setting section 112a is extended forward from a rear side of the drive section 112. There is formed an accommodating space in which extra cutter plates 114a and 114b are accommodated in a lower part of the setting section 112a.

A front shape of the drive section 112 is a rectangle as shown in FIG. 16. An upper face of the setting section 112a is opened, and a cover 118 having a cylindrical member 116 covers over the opened upper face of the setting section 112a. The cylindrical member 116 is set upward while the food processor operates; the cylindrical member 116 is set downward while the food processor is not used.

A plan shape of the cylindrical member 116 is a rectangle as shown in FIG. 15. A pushing rod 120 for pressing food materials in the cylindrical member 116 is shown in FIG. 16. There is telescopically provided a smaller pushing rod 120a in a pushing rod 120.

The cutter plate 114 is supported by three pair of rollers 122, which are attached on an inner face of an upper section of the setting section 112a. The state of supporting the cutter plate 114 by the rollers 122 is shown in FIG. 16.

As shown in FIG. 14, a drive mechanism for reciprocatively moving the cutter plate 114 has: an electric motor 124; a driving gear 126, which is connected to an output shaft of the motor 124 by gears 128a and 128b; a movable plate 130, which connects the driving gear 126 and the cutter plate 114.

An engage pin 132 is eccentrically provided on and extended upward from an upper face of the driving gear 126. There is provided a drive roller 134 on a top of the engage pin 132. The drive roller 134 is engaged with an engage hole 130a of the movable plate 130 so as to convert the rotary motion of the driving gear 126 to the linear reciprocative motion of the movable plate 130.

In FIG. 17, the movable plate 130 is formed into a T-shape in plan, and there is bored the engage hole 130a with which the drive roller 134 is engage in a base section. An arm 130b is extended from the base section, and there is provided an engage pin 130c, which is capable of engaging with the cutter plate 114, at a front end of the arm 130b. The engage hole 130a is formed in the direction perpendicular to the direction of the reciprocative movement of the cutter plate 114. Note that, to reciprocatively move the movable plate 130, pins 136a and 136b, which are vertically provided with respect to the engage hole 130a, in the base section of the movable plate 130. The pins 136a and 136b are engaged with a guide rail 138 (not shown in FIG. 14), which is fixed on a top plate of the drive section 112, so that the movable plate 130 is movably suspended. The state of suspending the movable plate 130 by the pins 136a and 136b in FIG. 18. There are respectively bored guide holes, with which the pins 136a and 136b are slidably engage, in the guide rail 138. The guide hole is formed in the direction of the movement of the cutter plate 130, so that the moving direction of the movable plate 130 is defined.

An operating switch 150 is provided on a side face of the drive section 112. A safety switch 152 detects if a cover 118 is set or not. A safety switch 154 detects if the tray 110 is set in the setting section 112a or not. The switch 152 does not work when the cover 118 is not fully attached. The switch 154 does not work when the tray 110 is not fully set.

Successively, the action of the food processor of the third embodiment will be explained.

When the driving gear 126 is rotated, the movable plate 130 is reciprocatively moved as well as the first and the second embodiments. Namely, with the rotation of the driving gear 126, the drive roller 134 is rotated and moved in the engage hole 130a of the movable plate 130, so that the movable plate 130 is pushed and reciprocatively moved along the guide rail 138. Since the pin 130c of the movable plate 130 is engaged with the cutter plate 130, the cutter plate 130 can be reciprocatively moved. Range of the movement of the cutter plate 130 is shown as A in FIG. 14.

Putting food materials, e.g., vegetables, into the cylindrical member 116, the food materials are processed by the cutter plate 114 reciprocatively moving, and the processed food falls into and accommodated in the tray 110, which has been located below the cutter plate 114.

The pin 130c of the movable plate 130 is engaged with and disengaged from a hole, which is bored in an end section of the cutter plate 114. Therefore, the cutter plate 114 can be exchanged to extra ones. An extra cutter plate 114 for slicing is shown in FIG. 19; and an extra cutter plate 114 for grating is shown in FIG. 20. The cutter sections for the extra cutter plates 114 are the same as those described in the first and the second embodiments. In the third embodiment, the drive section 112 has an accommodating section for accommodating the extra cutter plates 114, so that the extra cutter plates 114 for slicing, grating, etc. can be compactly accommodated therein. And the tray 110 and the cover 118 can be detached from the drive section 112, so that they can be respectively and easily washed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A food processor, comprising:
    a tray being capable of accommodating processed food, an upper face of said tray being opened;
    a cutter plate being provided to an upper section of said tray, said cutter plate being capable of reciprocatively moving along the upper face of said tray so as to process food materials;
    guiding means for supporting said cutter plate and guiding the reciprocative movement of said cutter plate, said guiding means being provided on an inner face of said tray;
    a cover being provided above said cutter plate and attached to said tray, said cover having a cylindrical member into which the food materials are put; and
    a drive section having driving means for reciprocatively moving said cutter plate and connecting means for mutually connecting said driving means and said cutter plate, said drive section being capable of attaching to the upper section of said tray, wherein said connecting means mutually connects said driving means and said cutter plate when said drive section is attached to said tray.

2. The food processor according to claim 1, wherein said cutter plate comprises:
    a frame section; and
    a cutter section being capable of attaching to and detaching from said frame section.

3. The food processor according to claim 2, wherein said cutter section comprises:
    a slicing blade for slicing the food materials;
    a shredding blade for shredding the food materials, said shredding blade facing said slicing blade; and
    an adjusting plate for adjusting thickness of the processed food, said adjusting plate being provided between said slicing blade and said shredding blade.

4. The food processor according to claim 1, further comprising an inner tray being attached on a bottom face of said cutter plate, whereby said inner tray can be moved in said tray together with said cutter plate.

5. The food processor according to claim 1, wherein said drive section comprises:
    an electric motor;
    a driving gear being rotated by said motor, said driving gear being capable of rotating in a plane parallel to a plane in which said cutter plate is reciprocatively moved;
    a drive roller being eccentrically attached to said driving gear, said drive roller being projected from the plane in which said driving gear is rotated;
    a movable plate having an engage hole, which is movably engaged with said drive roller and which is capable of limiting a stroke of the movement of said drive roller;
    a guide rail for guiding the movement of said movable plate in the direction parallel to the direction of the reciprocative movement of said cutter plate; and
    a drive lever being fixed to said movable plate and capable of engaging with said cutter plate.

6. The food processor according to claim 5, wherein said drive section further comprises:

a locking mechanism being fixed to said movable plate and projected from said cutter plate toward said movable plate.

7. The food processor according to claim 6, wherein said locking mechanism comprises:
two pairs of lock levers being provided to positions at which said lock levers are capable of contacting front and rear end faces of said projected section, said lock levers being capable of moving in the direction perpendicular to the direction of the movement of said projected section, each pair of said lock levers being biased to mutually contact and capable of mutually opening to introduce and engage with said projected section when said projected section contacts said lock levers.

8. A food processor, comprising:
a tray being capable of accommodating processed food, an upper face of said tray being opened;
a cutter plate being provided to an upper section of said tray, said cutter plate being capable of reciprocatively moving along the upper face of said tray so as to process food materials;
guiding means for supporting said cutter plate and guiding the reciprocative movement of said cutter plate, said guiding means being provided on an inner face of said tray;
a cover being provided above said cutter plate and attached to said tray, said cover having a cylindrical member into which the food materials are put; and
a stand for supporting said tray;
a drive section having driving means for reciprocatively moving said cutter plate and connecting means for mutually connecting said driving means and said cutter plate, said drive section being capable of attaching to the upper section of said tray, wherein said connecting means mutually connects said driving means and said cutter plate when said drive section is attached to said stand.

9. The food processor according to claim 8, wherein said cutter plate comprises:
a frame section; and
a cutter section being capable of attaching to and detaching from said frame section.

10. The food processor according to claim 9, wherein said cutter section comprises:
a slicing blade for slicing the food materials;
a shredding blade for shredding the food materials, said shredding blade facing said slicing blade; and
an adjusting plate for adjusting thickness of the processed food, said adjusting plate being provided between said slicing blade and said shredding blade.

11. The food processor according to claim 8, further comprising an inner tray being attached on a bottom face of said cutter plate, whereby said inner tray can be moved in said tray together with said cutter plate.

12. The food processor according to claim 8, wherein said drive section comprises:
an electric motor;
a driving gear being rotated by said motor, said driving gear being capable of rotating in a plane parallel to a plane in which said cutter plate is reciprocatively moved;
a drive roller being eccentrically attached to said driving gear, said drive roller being projected from the plane in which said driving gear is rotated;
a movable plate having an engage hole, which is movably engaged with said drive roller and which is capable of limiting a stroke of the movement of said drive roller;
a guide rail for guiding the movement of said movable plate in the direction parallel to the direction of the reciprocative movement of said cutter plate; and
a drive lever being fixed to said movable plate and capable of engaging with said cutter plate.

13. The food processor according to claim 12, wherein said drive section further comprises:
a locking mechanism being fixed to said movable plate and projected from said cutter plate toward said movable plate.

14. The food processor according to claim 13, wherein said locking mechanism comprises:
two pairs of lock levers being provided to positions at which said lock levers are capable of contacting front and rear end faces of said projected section, said lock levers being capable of moving in the direction perpendicular to the direction of the movement of said projected section, each pair of said lock levers being biased to mutually contact and capable of mutually opening to introduce and engage with said projected section when said projected section contacts said lock levers.

15. A food processor, comprising:
a tray being capable of accommodating processed food, an upper face of said tray being opened;
a cutter plate being provided above said tray, said cutter plate being capable of reciprocatively moving along the upper face of said tray so as to process food materials;
a setting section being capable of accommodating said tray, an upper face of said tray being opened;
a cover being provided above said cutter plate and attached to said setting section, said cover having a cylindrical member into which the food materials are put;
guiding means for supporting said cutter plate and guiding the reciprocative movement of said cutter plate, said guiding means being provided on an inner face of said setting section; and
a drive section having driving means for reciprocatively moving said cutter plate and connecting means for mutually connecting said driving means and said cutter plate, said drive section being capable of attaching to the upper section of said tray, wherein said connecting means mutually connects said driving means and said cutter plate when said drive section is attached to said setting section.

16. The food processor according to claim 15, wherein said cutter plate can be attached and detached.

17. The food processor according to claim 15, wherein said setting section is capable of accommodating an extra cutter plate.

18. The food processor according to claim 15, wherein said drive section comprises:
an electric motor;
a driving gear being rotated by said motor, said driving gear being capable of rotating in a plane parallel to a plane in which said cutter plate is reciprocatively moved;
a drive roller being eccentrically attached to said driving gear, said drive roller being projected from the plane in which said driving gear is rotated;

a movable plate having an engage hole, which is movably engaged with said drive roller and which is capable of limiting a stroke of the movement of said drive roller;

a guide rail for guiding the movement of said movable plate in the direction parallel to the direction of the reciprocative movement of said cutter plate; and a drive lever being fixed to said movable plate and capable of engaging with said cutter plate.

19. The food processor according to claim 18, wherein said drive section further comprises:

a locking mechanism being fixed to said movable plate and projected from said cutter plate toward said movable plate.

20. The food processor according to claim 19, wherein said locking mechanism comprises:

two pairs of lock levers being provided to positions at which said lock levers are capable of contacting front and rear end faces of said projected section, said lock levers being capable of moving in the direction perpendicular to the direction of the movement of said projected section, each pair of said lock levers being biased to mutually contact and capable of mutually opening to introduce and engage with said projected section when said projected section contacts said lock levers.

* * * * *